Figure 1:
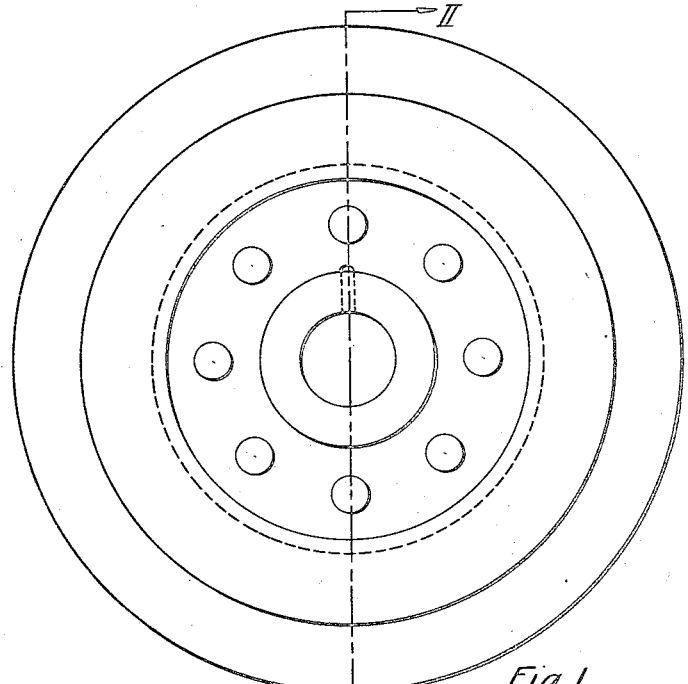

Jan. 2, 1923.

L. T. FREDERICK.
NOISELESS TIRE.
FILED MAY 15, 1919.

1,440,453

WITNESSES:
J. A. Helsel.
O. E. Bee.

INVENTOR
Louis T. Frederick.
BY
Wesley G. Carr
ATTORNEY

Patented Jan. 2, 1923.

1,440,453

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

NOISELESS TIRE.

Application filed May 15, 1919. Serial No. 297,354.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Noiseless Tires, of which the following is a specification.

My invention relates to tires and it has, for its primary object, the provision of tires which may be employed on the wheels of vehicles utilized in moving merchandise in warehouses or other similar places where vehicles of this type are employed.

One object of my invention is to provide tires which shall insure noiseless operation of vehicles and which shall possess a relatively high coefficient of friction, thereby reducing the danger of skidding of the vehicle wheels and promoting better operating conditions.

A further object of my invention is to provide tires which shall be unaffected by moisture, weak acids, alkalis, oils and relatively wide temperature changes.

A still further object of my invention is to provide tires for trucks or like vehicles which shall be exceptionally durable and which shall obviate the danger of destroying, or materially injuring wood floors.

With these and other objects in view, my invention will be more fully described, illustrated in the drawings, in the several views of which corresponding numerals indicate like parts, and then particularly pointed out in the claims.

Figure 2:
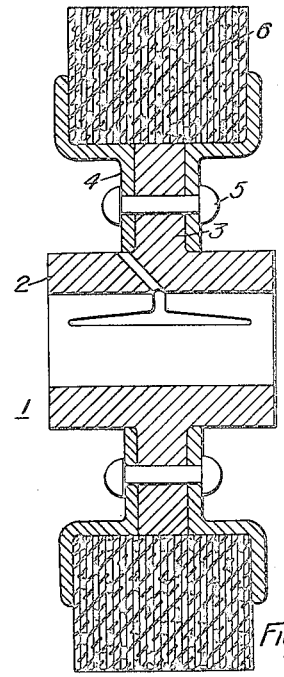
Figure 3:
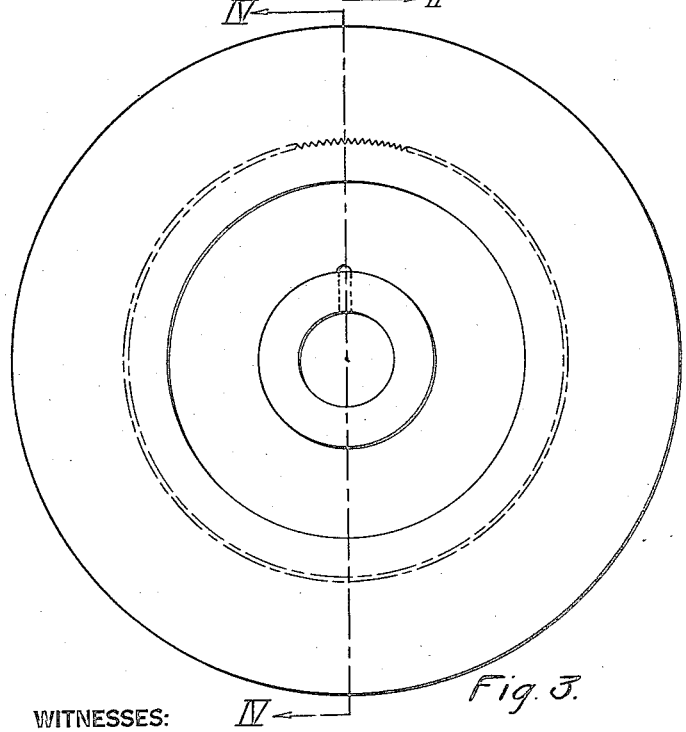
Figure 4:
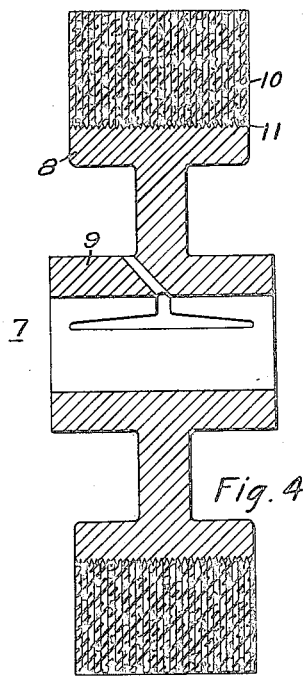

In the drawings, Fig. 1 is a side view of a wheel having a tire secured thereon which embodies my invention; Fig. 2 is a sectional view taken substantially along the line II—II of Fig. 1; Fig. 3 is a side view of a modified form of wheel having a tire secured thereto in accordance with my invention, and Fig. 4 is a sectional view taken substantially along the line IV—IV of Fig. 3.

In practising my invention, I may provide a tire, for various types of vehicle wheels, by employing sheets of fibrous material and sheets of material possessing a high coefficient of friction, such as cork. The sheets of material may be cut or punched to form rings of suitable dimension which may be impregnated with a suitable binder and stacked in layers to provide a tire of the required thickness. In order to compact and unite the stacked material, it may be subjected to heat and pressure. The punched and treated material may also be subjected to heat and pressure after being assembled upon the periphery of the wheel to firmly secure it thereto. The cork is employed to obtain a sufficiently high coefficient of friction in the finished tire, and the fibrous material is utilized to increase its rigidity and mechanical strength.

In Figs. 1 and 2 is shown a wheel 1 which comprises a hub portion 2 having an annular rim 3 formed integrally therewith. A plurality of flanged rim members 4 are secured to the rim 3 by rivets 5 to provide a suitable supporting base for a tire 6. The tire 6 may comprise alternate layers of fibrous material, such as duck and cork. The layers may be provided by punching suitable rings from the material which may be impregnated with a binder, such as a phenolic condensation product. The material may be treated with the binder and subjected to sufficient heat to dry the binder, thus facilitating subsequent handling thereof.

In order to secure the tire 6 to the wheel 1, the rings of treated material may be stacked to a suitable thickness and subjected to heat and pressure to compact the material and to harden the binder, thus forming a unitary body. The tire, formed in this manner, may be disposed upon the periphery of the rim 3, after which the members 4 may be secured to the rim by the rivets 5, thus providing a suitable support for the tire from which it cannot possibly be removed under working conditions.

The tire 6 may also be secured to the wheel 1 by disposing the punched layers of treated material in place and then subjecting them to heat and pressure to form a compact and homogeneous tire. By applying the heat and pressure to the material after it has been assembled upon the wheel, a slight advantage may be obtained by reason of the binding action between the binder of the material and the rim of the wheel. In a wheel of the type shown in Figs. 1 and 2, however, this is unnecessary, as the rim provides ample fastening means to secure the tire in place.

In Figs. 3 and 4 is shown a wheel 7 having a rim 8 which is formed integrally with the hub portion 9. A tire 10, of the above described character, may be secured to a wheel of this type by assembling the punchings or rings of treated material upon the periphery of the rim 8, after which heat and pressure may be applied to compact the layers of material and to harden the binder. The rim 8 may be roughened, as indicated at 11, to insure better binding action between the tire and the rim. A tire molded upon a wheel in this manner possesses practically as great mechanical strength and remains as firmly in place as a tire disposed upon a flanged rim, such as shown in Figs. 1 and 2. This is true because of the exceptionally good binding action obtained between the treated material and the rim of the wheel.

Although alternate layers of duck and cork have been shown, it is entirely possible to employ layers of material assembled in various ways. For example, several layers of fibrous material to one layer of cork may be employed if the resulting coefficient of friction of a tire thus formed is sufficiently high for its intended duty. As fibrous material, such as duck, impregnated with a phenolic condensation product, possesses greater mechanical strength than cork correspondingly treated, it will be obvious that the greater the amount of duck employed, the greater the mechanical strength of the resultant tire will be. When alternate layers of duck and cork are employed, however, sufficient mechanical strength is obtained for tires to be employed upon the wheels of trucks, such as are used for moving merchandise in business houses. Furthermore, the particular shape of the tire may be varied as desired. The resulting shape of the tire may be easily governed by properly cutting the layers of material which are to be stacked and molded together to provide the tire.

Although I have described a tire which may be constructed in accordance with my invention, it will be obvious that minor changes may be made in the construction thereof and I desire, therefore, that no limitations shall be imposed except such as are indicated in the appended claims.

I claim as my invention:

1. A tire comprising layers of fibrous material and cork impregnated with a hardened binder.

2. A tire comprising layers of duck and cork impregnated with a hardened binder.

3. A tire comprising layers of duck and cork impregnated with a hardened phenolic condensation product.

4. A tire comprising alternate layers of duck and cork impregnated with a hardened binder.

5. A tire comprising alternate layers of duck and cork impregnated with a hardened phenolic condensation product.

In testimony whereof, I have hereunto subscribed my name this 29th day of April 1919.

LOUIS T. FREDERICK.